US008730762B2

(12) United States Patent
Minto et al.

(10) Patent No.: US 8,730,762 B2
(45) Date of Patent: May 20, 2014

(54) AUTOMATIC PROGRAMMED ACQUISITION USING DOWNHOLE SEISMIC SOURCES

(75) Inventors: James Minto, Houston, TX (US); Bruce P. Marion, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 274 days.

(21) Appl. No.: 13/111,480

(22) Filed: May 19, 2011

(65) Prior Publication Data

US 2012/0294115 A1    Nov. 22, 2012

(51) Int. Cl.
*G01V 1/00*    (2006.01)
*G01V 1/40*    (2006.01)

(52) U.S. Cl.
CPC .................................. *G01V 1/40* (2013.01)
USPC .......................................................... 367/25

(58) Field of Classification Search
CPC .............. G01V 1/52; G01V 1/40; G01V 1/46
USPC ............... 181/104, 107, 103, 106; 340/853.3, 340/854.6, 854.8
See application file for complete search history.

(56) References Cited

U.S. PATENT DOCUMENTS

| | | | | |
|---|---|---|---|---|
| 5,438,169 A | * | 8/1995 | Kennedy et al. | 181/102 |
| 5,724,308 A | * | 3/1998 | Sorrells et al. | 367/34 |
| 5,747,754 A | * | 5/1998 | Svenning et al. | 367/17 |
| 2003/0117895 A1 | * | 6/2003 | Brandsaeter | 367/81 |
| 2003/0179651 A1 | * | 9/2003 | Nutt et al. | 367/25 |
| 2006/0062082 A1 | * | 3/2006 | Mandal | 367/25 |
| 2006/0077757 A1 | * | 4/2006 | Cox et al. | 367/25 |
| 2006/0081413 A1 | * | 4/2006 | Minto | 181/111 |
| 2007/0153628 A1 | * | 7/2007 | Mathiszik et al. | 367/57 |
| 2007/0280048 A1 | * | 12/2007 | Dubinsky et al. | 367/31 |
| 2007/0285274 A1 | * | 12/2007 | Esmersoy | 340/853.5 |
| 2009/0073807 A1 | * | 3/2009 | Sitton et al. | 367/38 |
| 2009/0283355 A1 | * | 11/2009 | Minto et al. | 181/106 |

FOREIGN PATENT DOCUMENTS

| | | |
|---|---|---|
| GB | 2298487 A | 9/1996 |
| GB | 2355477 A | 4/2001 |
| GB | 2405929 A | 3/2005 |
| RU | 2181494 C2 | 4/2002 |

* cited by examiner

*Primary Examiner* — Isam Alsomiri
*Assistant Examiner* — Hovhannes Baghdasaryan
(74) *Attorney, Agent, or Firm* — Jeremy Berman

(57) ABSTRACT

The present disclosure relates to making seismic measurements using a seismic source disposed in a wellbore. One or more seismic sources are provided and carried on a conveyance mechanism. One or more seismic receivers are provided and placed on or near the earth's surface, in the same wellbore as the seismic sources, or in another wellbore. The one or more seismic sources are run into and/or out of the wellbore using a controller or sequencer. The one or more seismic sources are positioned, manually or automatically, at one or more locations in the wellbore, using a set of computer-controlled instructions. Seismic measurements are made at the one or more locations by activating the one or more seismic sources and detecting a seismic source signal using the seismic receivers. The receivers may be carried on a conveyance mechanism and their position controlled, manually or automatically, using the set of computer-controlled instructions.

20 Claims, 4 Drawing Sheets

AUTOMATIC PROGRAMMED ACQUISITION USING DOWNHOLE SEISMIC SOURCES

TECHNICAL FIELD

The present application relates generally to the field of well logging, and particularly to seismic well logging.

BACKGROUND

Geophysical prospecting has been used extensively in the search for underground resources such as oil, gas, and minerals. Common techniques used for exploration include seismic, gravity, magnetic, and electrical methods. Seismic is historically the most widely used and can be subcategorized into seismic reflection and seismic refraction methods. With the seismic reflection method, the structure of subsurface formations is mapped by measuring the times required for a seismic wave, generated in the earth by a near-surface explosion, mechanical impact, vibration, or air gun, for example, to return to the surface after reflection from interfaces between formations having different physical properties. The reflections are recorded by detecting instruments responsive to ground motion or pressure waves. With reflection methods, one can locate and map, for example, such features as anticlines, faults, salt domes, and reefs.

The recorded data generally are processed using computers prior to being interpreted. The basic objective of seismic processing is to convert the information recorded in the field into a form that best facilitates geological interpretation. The field data are transformed into corrected record sections. One object of the processing is to eliminate or reduce noise. Another is to present the reflections with the greatest possible resolution.

Seismic sources may be placed in a wellbore is to provide seismic data that originates closer to the target formations of interest to enhance imaging and measurement accuracy and resolution. Applications include crosswell seismic, single-well seismic imaging, reverse vertical seismic profiling, and microseismic monitoring of velocity measurements, velocity calibration, and sensor orientation. In each of those methods, fine spatial sampling is required to meet the Nyquist criterion for spatial sampling and to provide a spatial multiplicity of measurements to enhance the accuracy of tomographic inversion methods and velocity calibration methods.

SUMMARY

The present disclosure relates to making seismic measurements using a seismic source disposed in a wellbore. One or more seismic sources are provided and carried on a conveyance mechanism. One or more seismic receivers are provided and placed on or near the earth's surface, in the same wellbore as the seismic sources, or in another wellbore. The one or more seismic sources are run into and/or out of the wellbore using a controller or sequencer. The one or more seismic sources are positioned, manually or automatically, at one or more locations in the wellbore, using a set of computer-controlled instructions. Seismic measurements are made at the one or more locations by activating the one or more seismic sources and detecting a seismic source signal using the seismic receivers. The receivers may be carried on a conveyance mechanism and their position controlled, manually or automatically, using the set of computer-controlled instructions.

Figure 1:
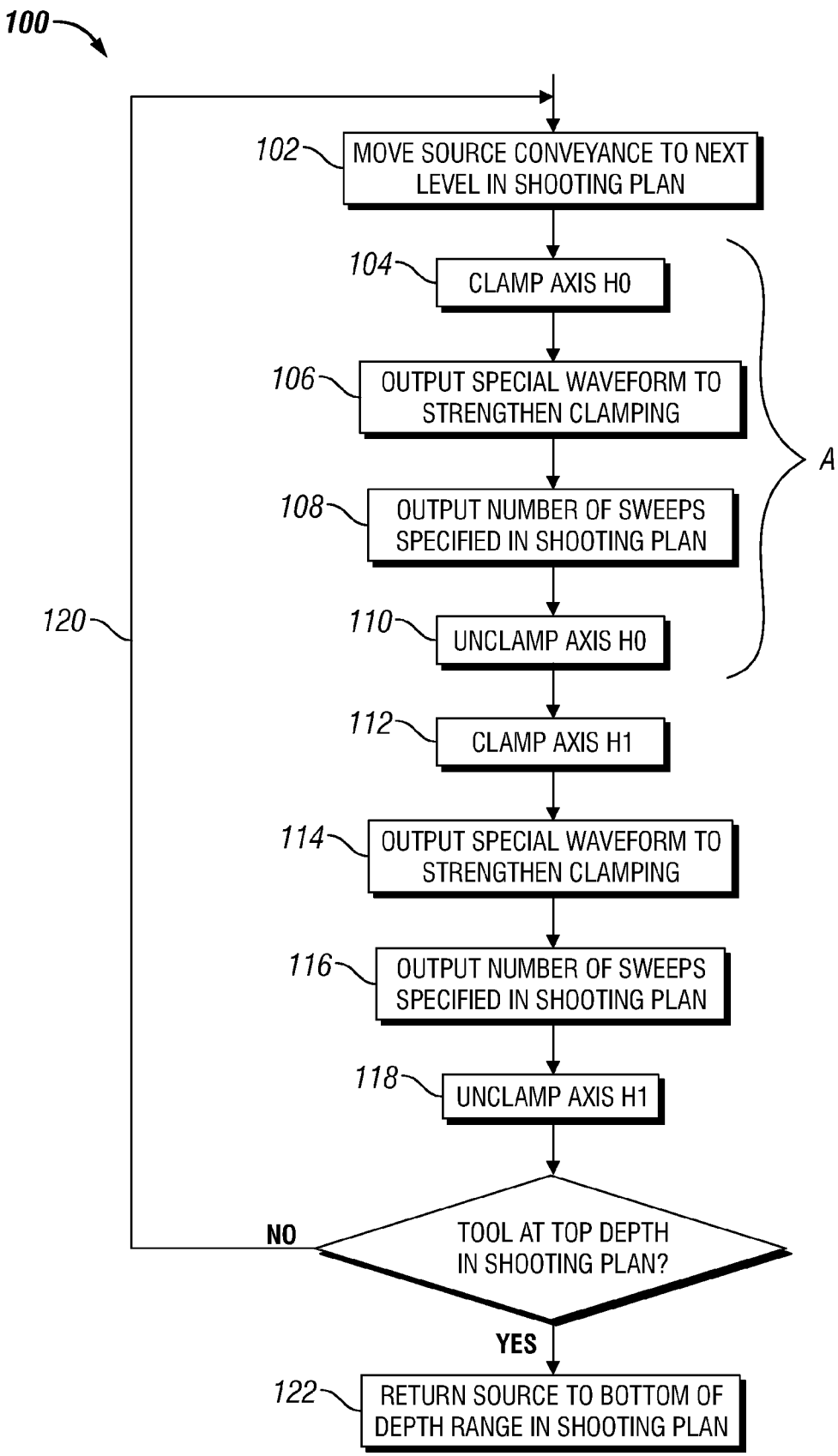
FIG. 1 is a flowchart showing, for one embodiment, the steps of making seismic measurements using a seismic source disposed in a wellbore, in accordance with the present disclosure.

It is to be understood that the drawings are to be used for the purpose of illustration only, and not to limit the scope of the appended claims.

DETAILED DESCRIPTION

Specific embodiments will now be described with reference to the figures. Like elements in the various figures will be referenced with like numbers for consistency. In the following description, numerous details are set forth to provide an understanding of the present disclosure. However, it will be understood by those skilled in the art that the present invention may be practiced without many of these details and that numerous variations or modifications from the described embodiments are possible.

The present disclosure applies, for example, to cross-borehole (or crosswell) logging, borehole-to-surface logging, or in-hole logging by seismic means for boreholes that are open, cased and cemented, or partially cased and cemented and partially open. In one embodiment, a source and/or a receiver may be run in and/or out and activated at many discrete positions in the wellbore to produce finely sampled data sets. Because repetitive field operations performed manually are subject to operator error, an automated program or sequencer designed to efficiently perform a variety of steps that provide efficient downhole source or receiver operation and improved data quality is preferably used. An example of efficient operation of a downhole source/receiver conveyance mechanism is one that minimizes time in the well. Logging time is typically associated with deferred production, so costs are directly attributable to excess logging time. Thus, automated control of the conveyance mechanism (e.g., wireline, coiled tubing, or drill pipe) to more precisely and efficiently position the source or receiver in the wellbore can improve operational efficiency and thereby minimize costs.

Additional control parameters of such an automated program for the source may include the sequencing of a multiplicity of elements within the source and the sequencing of drive waveforms and clamping signals for a clamped source. Specialized waveforms that assist in obtaining a stable clamping of the tool to the casing/formation, and waveforms to better match the source impedance to the impedance of the formations and/or casing and cement at which the source is positioned may be produced by the automated program. Preset waveforms may be modified to achieve various objectives.

More specifically, such specialized waveforms may be derived and output, for example, to drive a clamp mechanism so as to stabilize the clamping prior to initiating source drive waveforms. The resulting waveforms may be based on the testing of the source with repeated waveforms to determine the drive type and drive duration necessary to reach a point of relative repeatability for the source output on repeated sweeps. Casing characteristics may be derived from wellbore completion diagrams and casing corrosion measurements. Source characteristics describing particular source component characteristics can be included in the modification of the source output based on data taken in calibrated test fixtures or test wells.

Alternatively, the source may be driven with a waveform designed for the specific formation or casing/cement at which the source is positioned. Depending on the source output impedance, the formation impedance can be matched to maximize power transfer based on information about the formation impedance such as that from sonic and/or density log data and cement bond logs for cement quality. Also, based on cement and formation characteristics, the source output can be modified at each source position to minimize the risk of damaging the cement, and to modify the source output to account for variations in the casing and cement. In zones of the well in which the cement quality is variable, the source output may be varied to avoid overdriving (a type of distortion).

For a multiplicity of axes, multi-component seismic data may be generated by sequencing the signal output along the different axes. Also, for a potential multiplicity of sections of the source, "beam-forming" may be performed by sequencing the drive waveforms to dynamically vary the length of the source as a function of the input drive frequencies.

One embodiment of an automated program for borehole source control is implemented in Schlumberger Technology Corporation's Z-TRAC™ source system. That program sequences source clamping and the sweep output for two axes of a multi-component, clamped borehole source. Additionally, the automated program has the ability to modify the source spectrum and to provide a specialized waveform to assist clamping of an axis prior to initiation of the sweep waveform. This particular implementation is a software program residing on and executed by a digital computer that provides an interface to control lines for an electrically driven wireline and a digital to analog converter to provide programmed waveforms to the source drive amplifier and the magnetic clamp circuits.

The embodiment in FIG. 1 provides an example of a source control program 100 for a clamped, two-axis source. The source is moved (step 102) to a position in the shooting plan using conveyance under the control of the program 100. Once at the position, the first axis is clamped (step 104). Then a special waveform is used to enhance clamping (step 106). The specific motion provided by the waveform works to more closely couple the tool via the clamp. Next, the number of sweeps specified in the shooting plan are output (step 108), with specified delay time between sweeps. The first axis is then unclamped (step 110). The process described above for the first axis, is then repeated for the second axis (steps 112, 114, 116, 118). If the current source position is not the top (final) position in the shooting plan, the source conveyance is moved to the next position (step 120) and the process described above is repeated. When the top position is reached, the source conveyance is moved to the bottom (initial) position (step 122) and the next pass of the source in the shooting plan is initiated.

Figure 2:
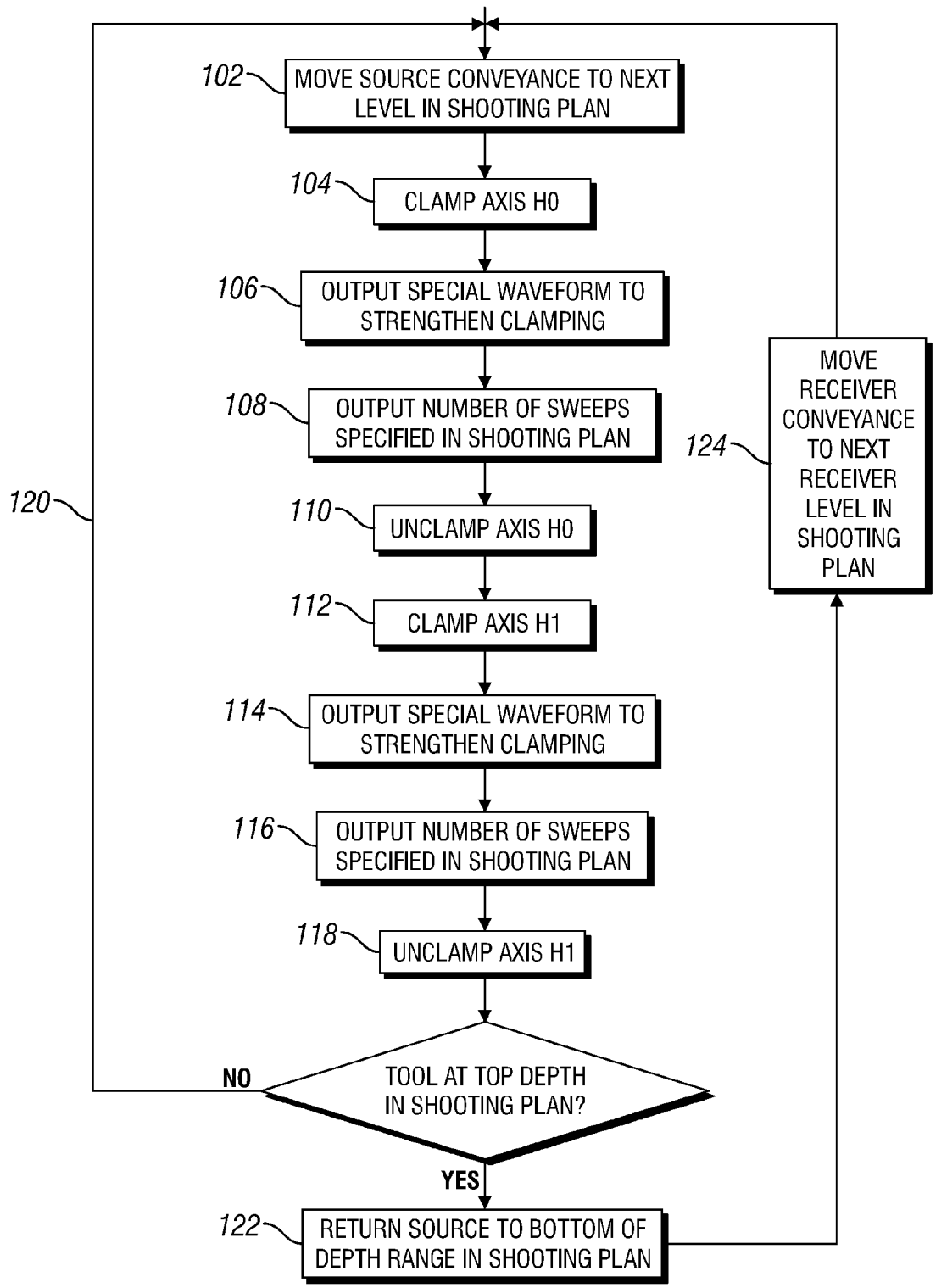
FIG. 2 is a flowchart showing the embodiment of FIG. 1 with the additional function of positioning the receiver conveyance, in accordance with the present disclosure

The embodiment in FIG. 2 is the same as that in FIG. 1, except that before the source is positioned to the bottom of the shooting plan interval to start a new pass up the well, the receiver conveyance is automatically moved (step 124) to the next receiver position in the shooting plan. Other parameters of the receivers including recording gain, bandwidth, and sample rate can also be modified.

Figure 3:
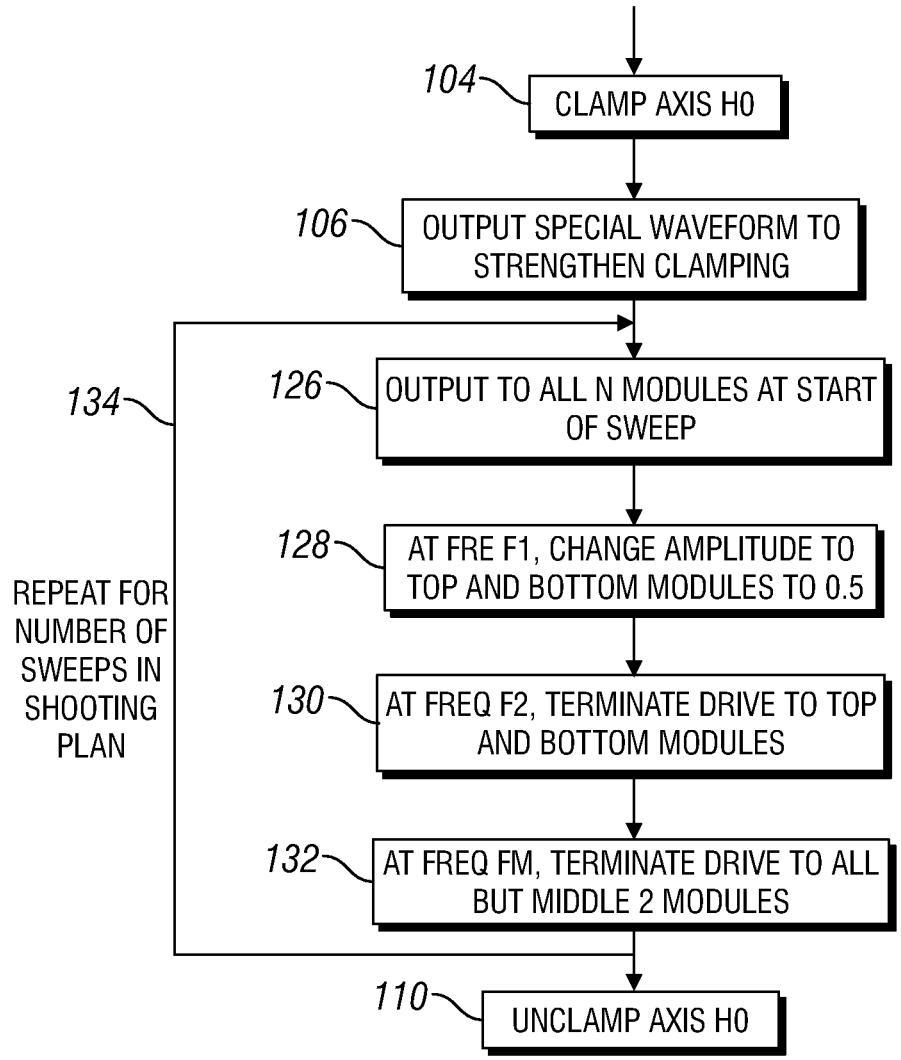
FIG. 3 is a flowchart showing section A of the embodiment in FIG. 1, with additional control to modify the length of the source signal during the source sweep.

The embodiment in FIG. 3 shows an alternative embodiment pertaining to steps in the portion identified as section A in FIG. 1. Instead of a fixed sweep signal driving all elements, the elements are driven by a foreshortened source as the sweep frequency is increased. As the frequency increases, progressively fewer of the n modules are driven (steps 126, 128, 130, etc. to 132). To make the transition in length smoother with frequency, the drive on the end modules is decreased prior to turning those modules off. The program is repeated for each sweep output (step 134).

Figure 4:
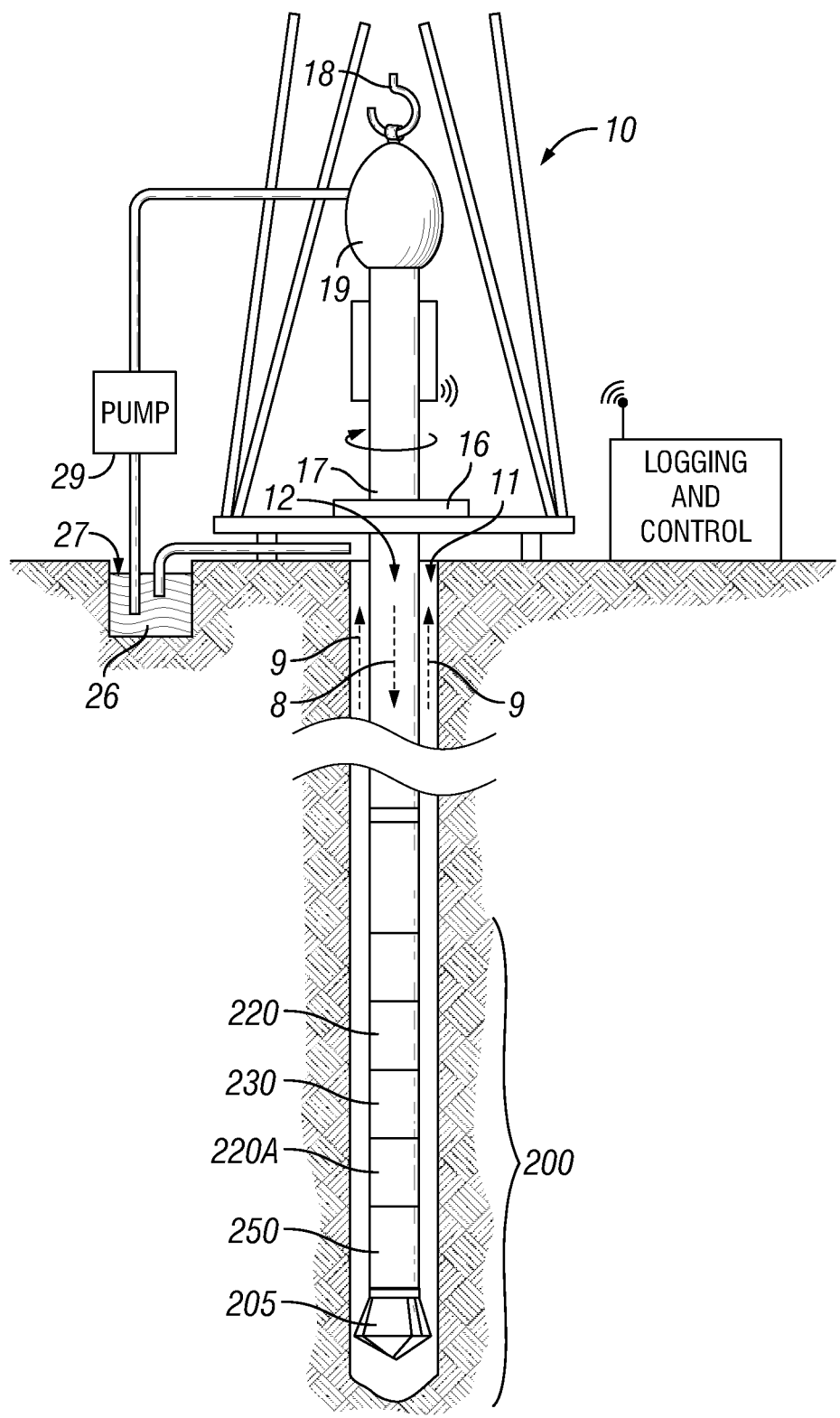
FIG. 4 is a schematic drawing showing an embodiment of a seismic measurement device disposed in a wellbore, in accordance with the present disclosure.

FIG. 4 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 200 which includes a drill bit 205 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 205, and then circulates upwardly through the annulus region between the outside of the drill string and the wall of the borehole, as indicated by the directional arrows 9. In this well known manner, the drilling fluid lubricates the drill bit 205 and carries formation cuttings up to the surface as it is returned to the pit 27 for recirculation.

The bottom hole assembly 200 of the illustrated embodiment includes a logging-while-drilling (LWD) module 220, a measuring-while-drilling (MWD) module 230, a roto-steerable system and motor, and drill bit 205.

The LWD module 220 is housed in a special type of drill collar, as is known in the art, and can contain one or a plurality of known types of logging tools. It will also be understood that more than one LWD and/or MWD module can be employed, e.g. as represented at 220A. (References, throughout, to a module at the position of 220 can alternatively mean a module at the position of 220A as well.) The LWD module includes capabilities for measuring, processing, and storing information, as well as for communicating with the surface equipment. In the present embodiment, the LWD module includes a seismic device.

The MWD module 230 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weighton-bit measuring device, a torque measuring device, a vibration measuring device, a shock measuring device, a stick/slip measuring device, a direction measuring device, and an inclination measuring device.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

As used in the claims herein, the set of computer-controlled instructions includes a single set of instructions controlling either or both conveyance mechanisms or multiple sets of instructions, each controlling a conveyance mechanisms separately.

While the invention has been described with respect to a limited number of embodiments, those skilled in the art, having benefit of this disclosure, will appreciate that other embodiments can be envisioned that do not depart from the scope of the invention as disclosed herein. Accordingly, the scope of the invention shall be limited only by the attached claims.

What is claimed is:

1. A method to make seismic measurements using a seismic source disposed in a cased wellbore, comprising:
   providing one or more seismic sources carried on a source conveyance mechanism;
   providing one or more seismic receivers;
   running the one or more seismic sources into or out of the wellbore;
   positioning the one or more seismic sources at one or more locations in the wellbore by controlling the conveyance mechanism using a set of computer-controlled instructions;
   making the seismic measurements at the one or more locations by activating the one or more seismic sources and detecting a seismic source signal using the seismic receivers, the one or more seismic sources being activated by sequencing drive waveforms based upon sonic or density log data; and
   prior to making each seismic measurement, magnetically clamping the one or more seismic sources to the cased wellbore.

2. The method of claim 1, wherein the source conveyance mechanism includes a wireline, a coiled tubing, or a drill pipe.

3. The method of claim 1, wherein the seismic receivers are arranged to allow for cross-borehole logging, borehole-to-surface logging, or in-hole logging.

4. The method of claim 1, wherein the one or more seismic receivers are carried on a receiver conveyance mechanism, and further comprising positioning the one or more receivers at one or more locations by controlling the receiver conveyance mechanism using the set of computer-controlled instructions.

5. The method of claim 4, wherein the source conveyance mechanism and the receiver conveyance mechanism are the same conveyance mechanism.

6. The method of claim 4, wherein the source positioning or the receiver positioning is controlled automatically.

7. The method of claim 1, wherein the source positioning is controlled automatically.

8. The method of claim 1, further comprising sequencing a multiplicity of elements within the one or more seismic sources.

9. The method of claim 1, further comprising sequencing clamping signals for a clamped seismic source.

10. The method of claim 1, further comprising generating multi-component seismic data.

11. The method of claim 10, further comprising sequencing the seismic sources.

12. The method of claim 1, further comprising avoiding distortion by varying the output of the one or more seismic sources.

13. A seismic measurement apparatus, comprising:
   one or more seismic sources carried on a source conveyance mechanism and disposed in a wellbore;
   one or more seismic receivers;
   a controller or sequencer to position the one or more seismic sources at one or more locations in the wellbore;
   control lines to interface the controller or sequencer and the conveyance mechanism; and
   a device to provide programmed waveforms to a source drive amplifier and magnetic clamp circuits, the programmed waveforms being based upon sonic or density log data.

14. The apparatus of claim 13, wherein the source conveyance mechanism is a wireline, a coiled tubing, or a drill pipe.

15. The apparatus of claim 13, wherein the controller or sequencer is a non-transitory computer-readable medium having a set of computer-readable instructions encoded thereon.

16. The apparatus of claim 13, wherein the device is a digital to analog converter.

17. The apparatus of claim 13, wherein the one or more seismic sources comprise at least two seismic sources and are directional along different axes.

18. The apparatus of claim 13, wherein at least one of the one or more seismic sources are clamped.

19. The apparatus of claim 13, wherein the one or more seismic receivers are carried on a receiver conveyance mechanism and positioned at one or more locations by the controller.

20. A downhole logging tool having one or more seismic sources carried on a conveyance mechanism, one or more seismic receivers, and a non-transitory computer-readable medium having a set of computer-readable instructions encoded thereon that, when executed, perform acts comprising:
   running the one or more seismic sources into or out of the wellbore;
   positioning the one or more seismic sources at one or more locations in the wellbore using a set of computer-controlled instructions;
   making seismic measurements at the one or more locations by activating the one or more seismic sources and detecting a seismic source signal using the seismic receivers, the one or more seismic sources being activated by sequencing drive waveforms based upon sonic or density log data; and prior to making each seismic measurement, magnetically clamping the one or more seismic sources to the cased wellbore by sequencing clamping waveforms.

* * * * *